United States Patent
Bertrand et al.

(10) Patent No.: US 9,319,928 B2
(45) Date of Patent: Apr. 19, 2016

(54) LINK ADAPTATION FOR LTE UPLINK

(71) Applicant: Texas Instruments Incorporated, Dallas, TX (US)

(72) Inventors: Pierre Bertrand, Antibes (FR); Jing Jiang, Wellesley, MA (US); Anthony Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 76 days.

(21) Appl. No.: 13/744,317

(22) Filed: Jan. 17, 2013

(65) Prior Publication Data

US 2013/0182569 A1    Jul. 18, 2013

Related U.S. Application Data

(60) Provisional application No. 61/587,900, filed on Jan. 18, 2012.

(51) Int. Cl.

| | |
|---|---|
| *H04L 12/26* | (2006.01) |
| *H04W 28/02* | (2009.01) |
| *H04L 1/00* | (2006.01) |
| *H04L 1/20* | (2006.01) |
| *H04L 1/18* | (2006.01) |

(52) U.S. Cl.
CPC ......... *H04W 28/0236* (2013.01); *H04L 1/0003* (2013.01); *H04L 1/0009* (2013.01); *H04L 1/0017* (2013.01); *H04L 1/0019* (2013.01); *H04L 1/0027* (2013.01); *H04L 1/203* (2013.01); *H04L 1/1816* (2013.01)

(58) Field of Classification Search
CPC ........ H04L 1/00; H04W 24/00; H04W 28/02; H04W 28/0236; H04W 28/18; H04W 72/04; H04W 72/08; H04W 72/085
USPC .................................................. 370/230–360
See application file for complete search history.

(56) References Cited

U.S. PATENT DOCUMENTS

| | | | |
|---|---|---|---|
| 2004/0014444 A1* | 1/2004 | Ben Rached | H04L 1/0009 455/135 |
| 2005/0281229 A1* | 12/2005 | Girola et al. | 370/335 |
| 2006/0114858 A1* | 6/2006 | Walton et al. | 370/335 |
| 2006/0153155 A1* | 7/2006 | Jacobsen | H04L 1/1829 370/338 |
| 2008/0137562 A1* | 6/2008 | Li et al. | 370/280 |
| 2009/0109907 A1* | 4/2009 | Tsai et al. | 370/329 |
| 2009/0238086 A1* | 9/2009 | Ringstrom et al. | 370/252 |
| 2012/0276896 A1* | 11/2012 | Ren et al. | 455/423 |
| 2013/0042157 A1* | 2/2013 | Mohammadi et al. | 714/704 |

* cited by examiner

*Primary Examiner* — Kevin C Harper
(74) *Attorney, Agent, or Firm* — Ronald O. Neerings; Frank D. Cimino

(57) ABSTRACT

A detailed design of an LTE Link Adaptation function for LTE uplink is disclosed. A new approach for adapting SINR backoff in OLLA is used when serving non-time-sensitive radio bearers without target BLER constraint. A sub-optimal scheduler is also disclosed wherein the SINR measurements at the ILLA input are updated on each TTI for the UEs scheduled in that sub-frame for future UL transmission with a fresher interference measurement from the sub-frame preceding by 8 ms the actual transmission sub-frame. This allows for exploitation of a correlation peak of the interference resulting from HARQ retransmissions. A schedule incorporating these features improves upon, with a minor complexity increase, the spectral efficiency performance of a low-complexity baseline scheduler only based on SINR updates at SRS rate.

17 Claims, 7 Drawing Sheets

LINK ADAPTATION FOR LTE UPLINK

CROSS-REFERENCE TO RELATED APPLICATIONS

The present application claims the benefit of the filing date of U.S. provisional patent application No. 61/587,900, filed Jan. 18, 2012, the disclosure of which is hereby incorporated by reference herein in its entirety.

BACKGROUND

A key function in wireless networks is link adaptation (LA), which is also referred to as adaptive modulation and coding (AMC). Link adaptation is aimed at estimating, based on available channel information, the most appropriate modulation order and coding rate to be used at a given time on a radio link to meet a target criterion, such as a block error rate (BLER). Fast link adaptation (FLA) was introduced in CDMA and GPRS systems and was later extended to high-speed downlink packet access (HSDPA) systems. FLA provided better utilization of instantaneous channel capacity since wireless channels are time-varying and frequency-selective. FLA relies on periodic measurements of the signal to interference plus noise ratio (SINR). This is also referred to as the channel quality indicator (CQI) of the access link. FLA essentially consists of comparing every new SINR update with a number of switching thresholds that partition locally-optimum modulation and coding schemes (MCS) along the SINR dimension. This allows for selection of the best MCS for that SINR.

In real systems, instantaneous SINR values include feedback delay (in addition to scheduling delay), estimation errors, and varying channel statistics. As a result, the SINR thresholds need to be adapted at a slower rate) to track and mitigate these imperfections. Algorithms for adapting the SINR thresholds are based on hybrid automatic repeat request (HARM) results (ACK/NACK) from the actual transmissions. The fast MCS selection and complementary slower threshold adaptation of the FLA are often referred to as Inner-Loop and Outer-Loop LA (ILLA/OLLA), respectively.

LA also plays an essential role in the Long Term Evolution (LTE) wireless networks, also known as Evolved Universal Terrestrial Radio Access Network (E-UTRAN), which are standardized by the 3GPP working groups. OFDMA and SC-FDMA (single carrier FDMA) access schemes are used for the down-link (DL) and up-link (UL) of E-UTRAN, respectively. This access scheme allows greater bandwidth efficiency (in contrast to WCDMA) with dynamic frequency aware radio resource allocation.

Allocation decisions are made by an LTE scheduler for every 1 ms transmission time interval (TTI). The allocation decisions are based on the expected instantaneous user throughput at a potential future transmission time for a selected modulation and coding scheme (MCS) as predicted by the LA function. Since LTE adds the frequency and space, for example Multiple Inputs Multiple Outputs (MIMO), dimensions in the scheduling space, research in LA for LTE downlink has mainly focused on the associated feedback schemes. Most basic principles of the HSDPA ILLA and OLLA were adapted to EUTRA DL, such as applying and adapting a backoff to the User Equipment's (UE) SINR measurements rather than adapting the MCS SINR switching thresholds.

In contrast, little focus was given to evolved universal terrestrial radio access (EUTRA) UL, which differs from the DL in several aspects pertinent to LA, such as: single-carrier access scheme, UL SINR is explicitly computed by the Base Station (or eNodeB) from various UL reference signals, synchronous HARQ is used with the possibility to send non-adaptive retransmissions, the UL interference is more dynamic, UE can be power limited, etc.

SUMMARY OF THE INVENTION

In one embodiment, an OLLA algorithm for achieving a Target BLER is performed at a base station in a wireless network. A success rate for P initial transmissions by user equipment served by the base station, also referred to as serving user equipment, is determined. A block error rate is determined based upon the success rate of the P initial transmissions. A current backoff parameter is increased if the estimated block error rate is greater than a target block error rate to create a new backoff parameter. The current backoff parameter is decreased if the estimated block error rate is less than the target block error rate to create the new backoff parameter. The backoff parameter may be increased or decreased by a predetermined step value to create the new backoff parameter.

The success rate for the P initial transmissions may be determined during a current measurement interval, and the new backoff parameter may be applied in a next measurement interval.

The current backoff parameter may be applied in an inner loop link adaptation process, and the new backoff parameter created as part of an outer loop link adaptation process. An SINR parameter for the UE may be modified using the current backoff parameter in an inner loop adaptation process.

In one embodiment, an OLLA algorithm for maximizing throughput without BLER constraint is performed at a base station in a wireless network. Throughput measurements for a user equipment are collected over P scheduled transmission time intervals. The throughput measurements are averaged across a measurement interval. The throughput measurements may be averaged using infinite impulse response (IIR) filtering. A relative throughput variation is computed across the measurement interval. The relative throughput variation is compared to a hysteresis threshold. A next backoff parameter value is modified relative to a current backoff parameter value if the relative throughput variation is greater than the hysteresis threshold. Alternatively, the next backoff parameter value is set equal to the current backoff parameter value if the relative throughput variation is not greater than the hysteresis threshold.

The next backoff parameter may be modified by a next step value. The next step parameter value is equal to a current step parameter value if a current relative throughput variation is greater than a previous relative throughput variation. The next step parameter value is equal to a current step parameter value with sign swap (i.e., multiplied by −1) if a current relative throughput variation is less than a previous relative throughput variation.

The current backoff parameter may be applied to an inner loop link adaptation process during a current measurement interval, and the next backoff parameter may be applied to the inner loop link adaptation process during a next measurement interval.

In another embodiment, a user equipment scheduler in a base station comprises a pre-scheduling module configured to compute SINR upon every new user equipment's Sounding Reference Signal (SRS), and a post-scheduling module configured to recompute the SINR of scheduled user equipment on every sub-frame. The pre-scheduling module may be configured to compute SINR with per-chunk granularity. The post-scheduling module may be configured to account for physical resource blocks allocated to the user equipment. The post-scheduling module may be configured to account for interference measurements from an earlier sub-frame preceding an actual transmission sub-frame by 8 ms, corresponding to the Hybrid Automatic Repeat reQuest (HARQ) period determined by the number of HARQ processes.

BRIEF DESCRIPTION OF THE DRAWINGS

Figure 1:
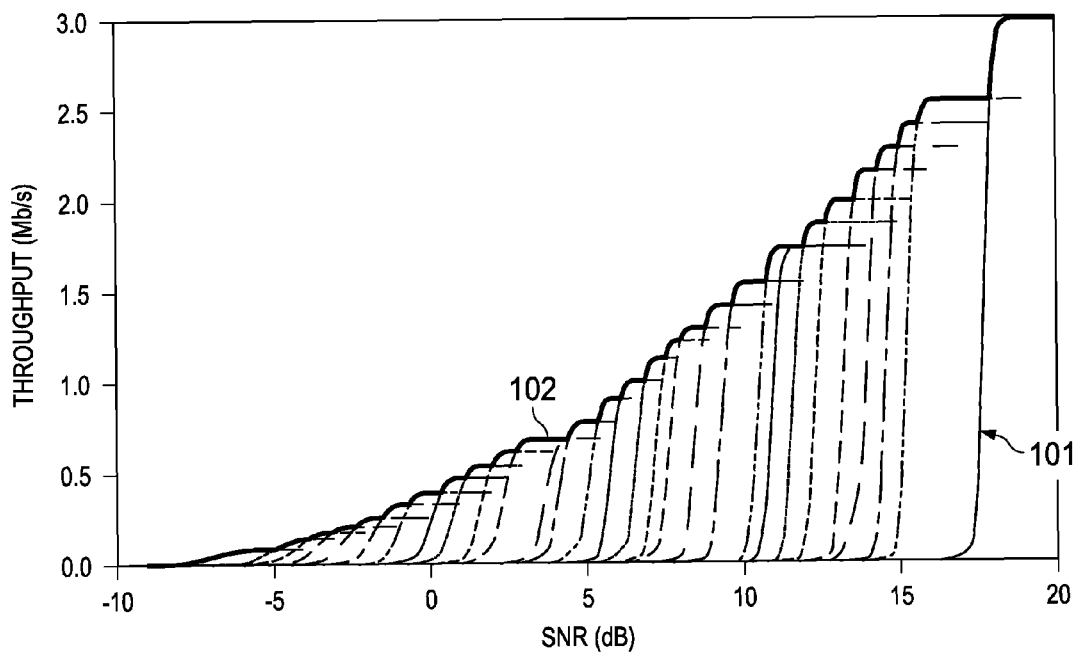

Having thus described the invention in general terms, reference will now be made to the accompanying drawings, wherein:

FIG. 1 illustrates MCS selection based on Max Throughput.

Figure 2:
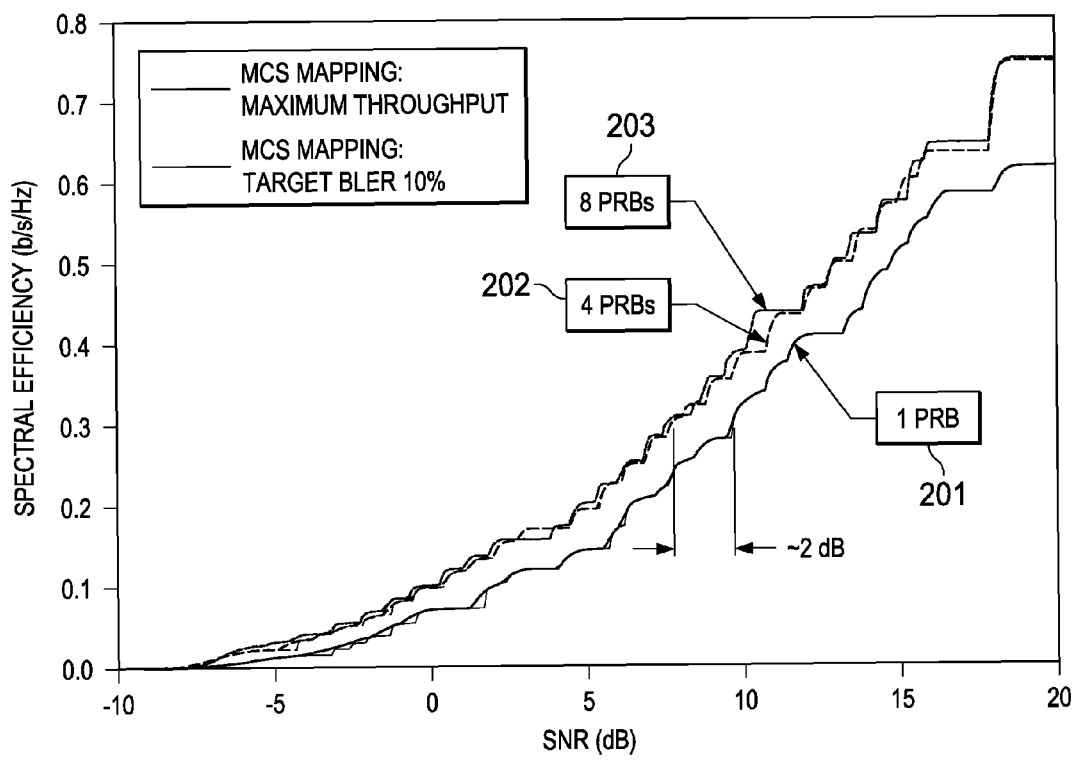

FIG. 2 illustrates spectral efficiency resulting from MCS mapping.

Figure 3:
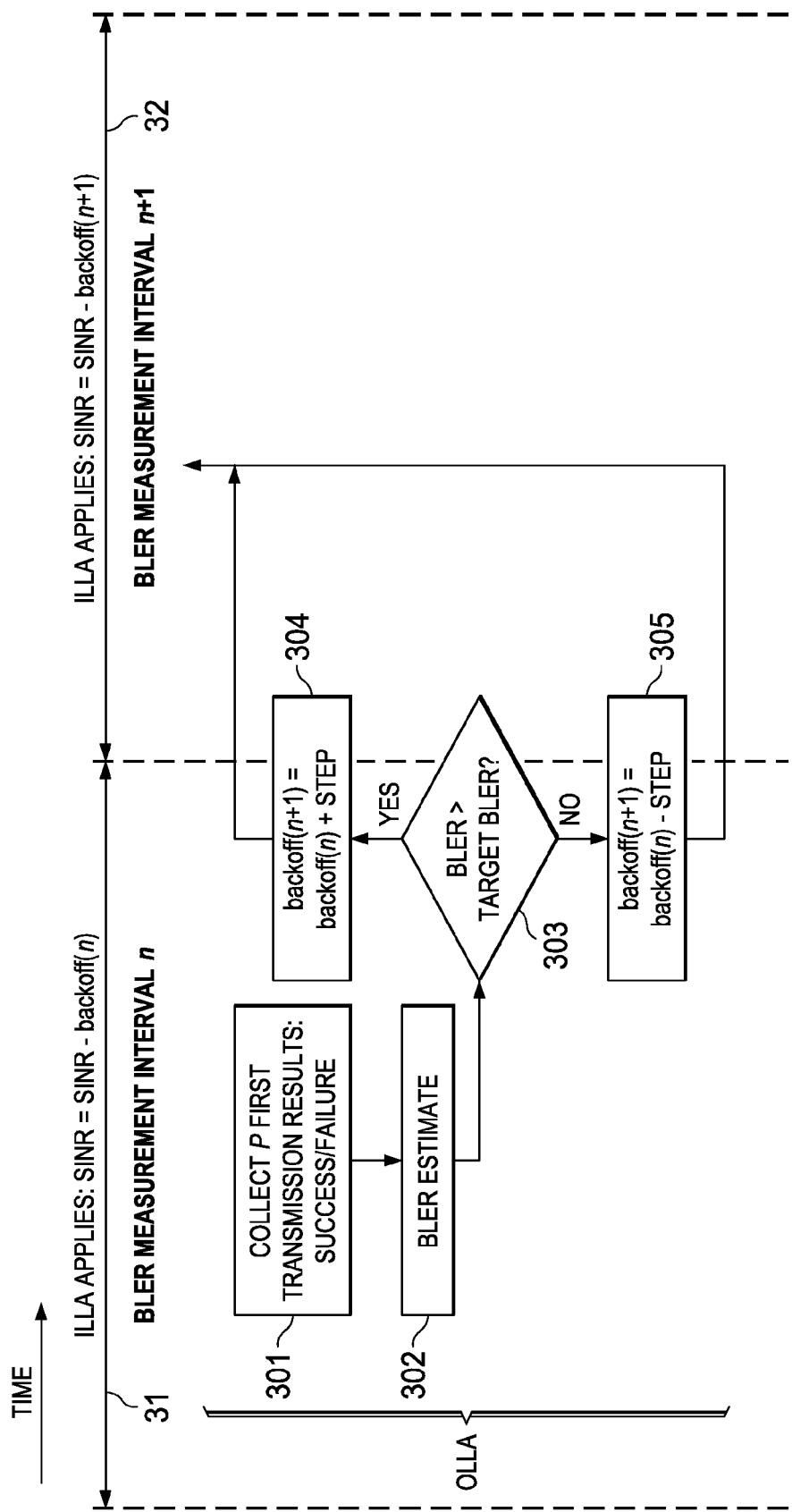

FIG. 3 illustrates an OLLA algorithm for the Target BLER MCS mapping criterion.

Figure 4:
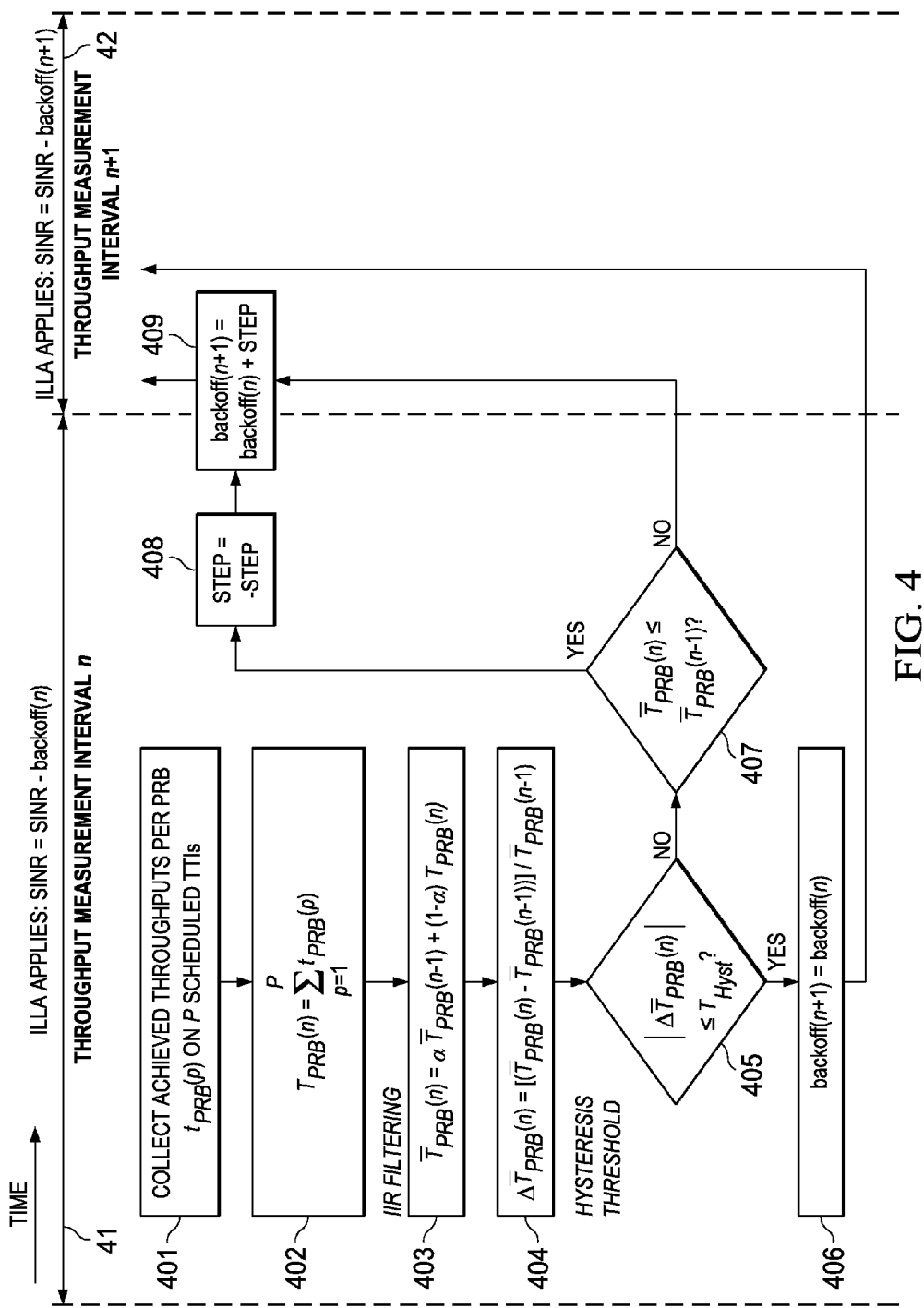

FIG. 4 illustrates an OLLA algorithm for the Max Throughput MCS mapping criterion.

Figure 5:
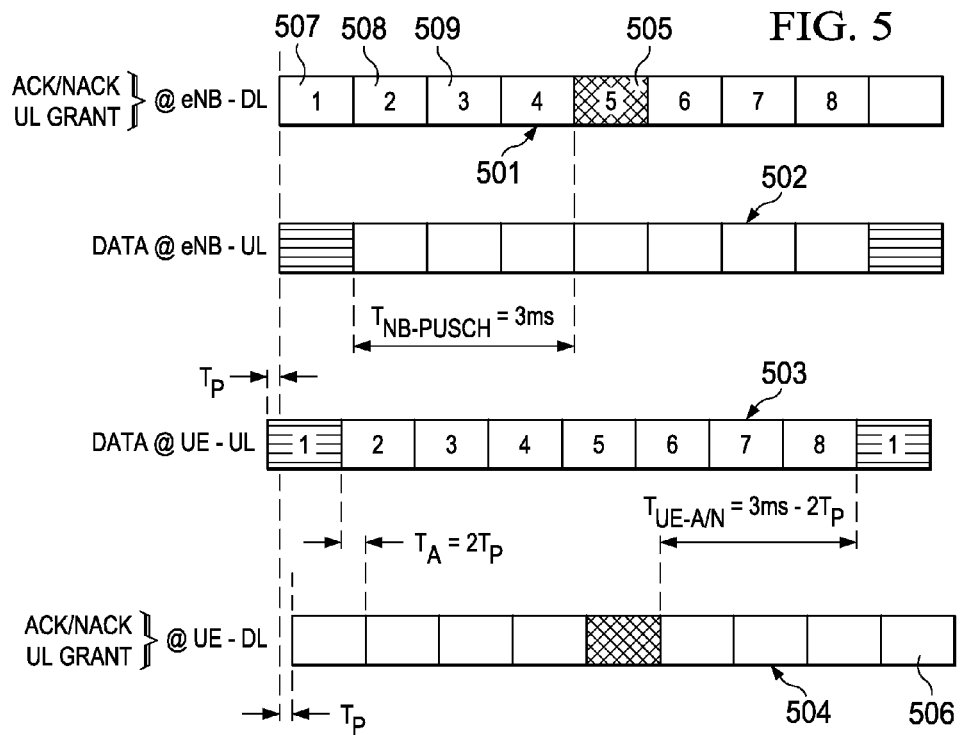

FIG. 5 illustrates uplink HARQ timing.

Figure 6:
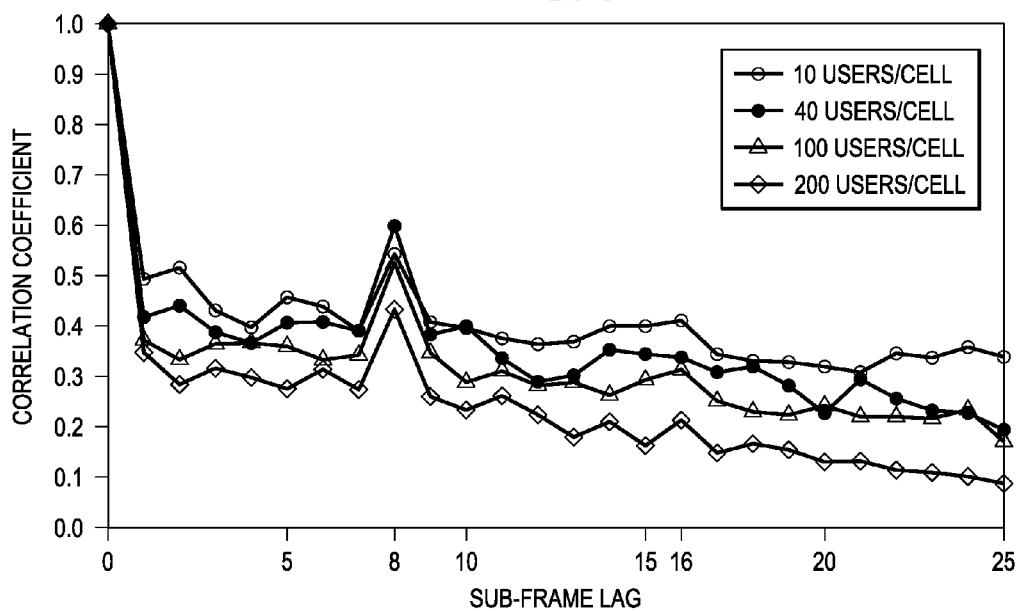

FIG. 6 illustrates the correlation coefficient in time of the received interference power per sub-carrier and per antenna.

Figure 7:
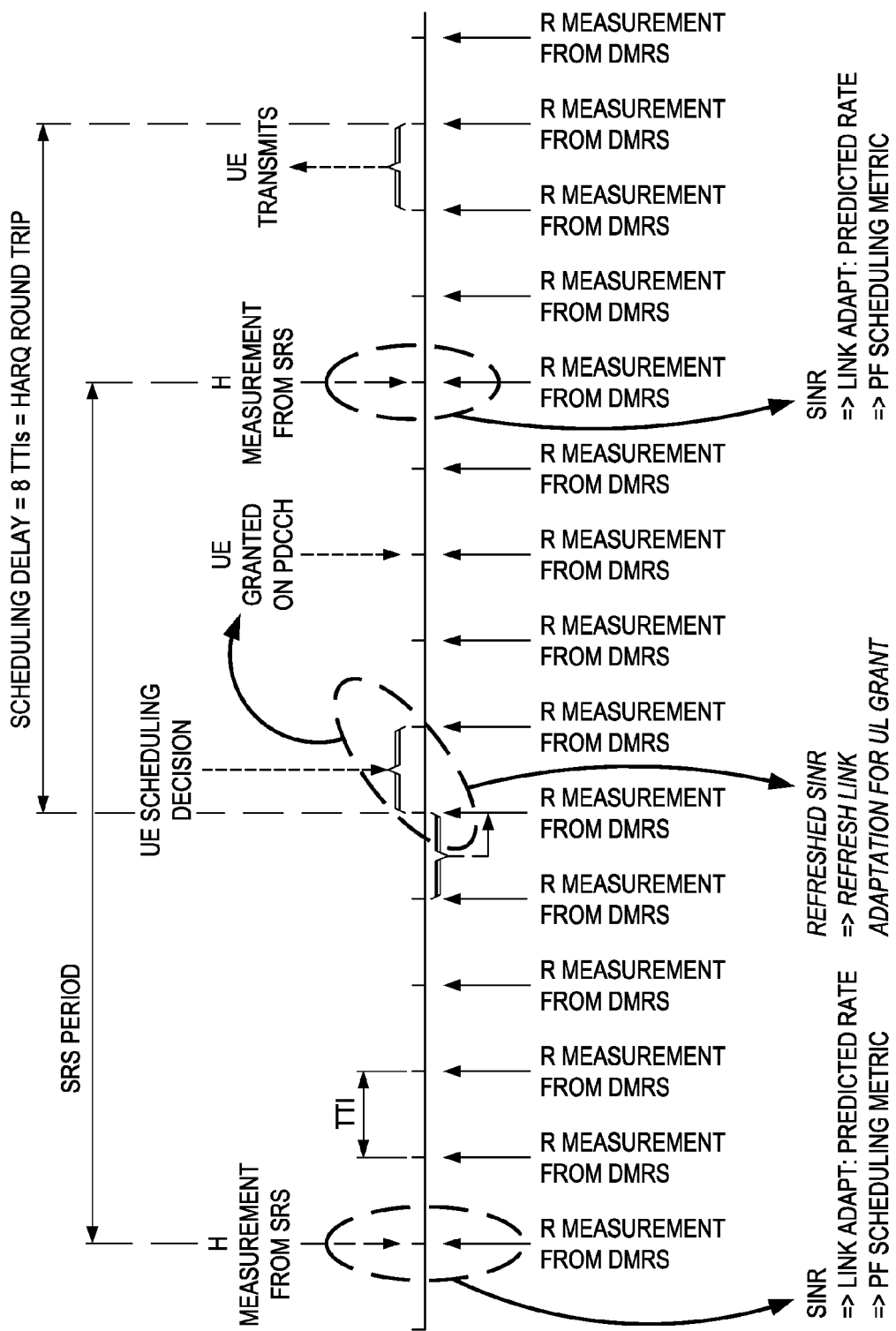

FIG. 7 illustrates the principle of a two-step SINR computation and link adaptation scheme.

Figure 8:
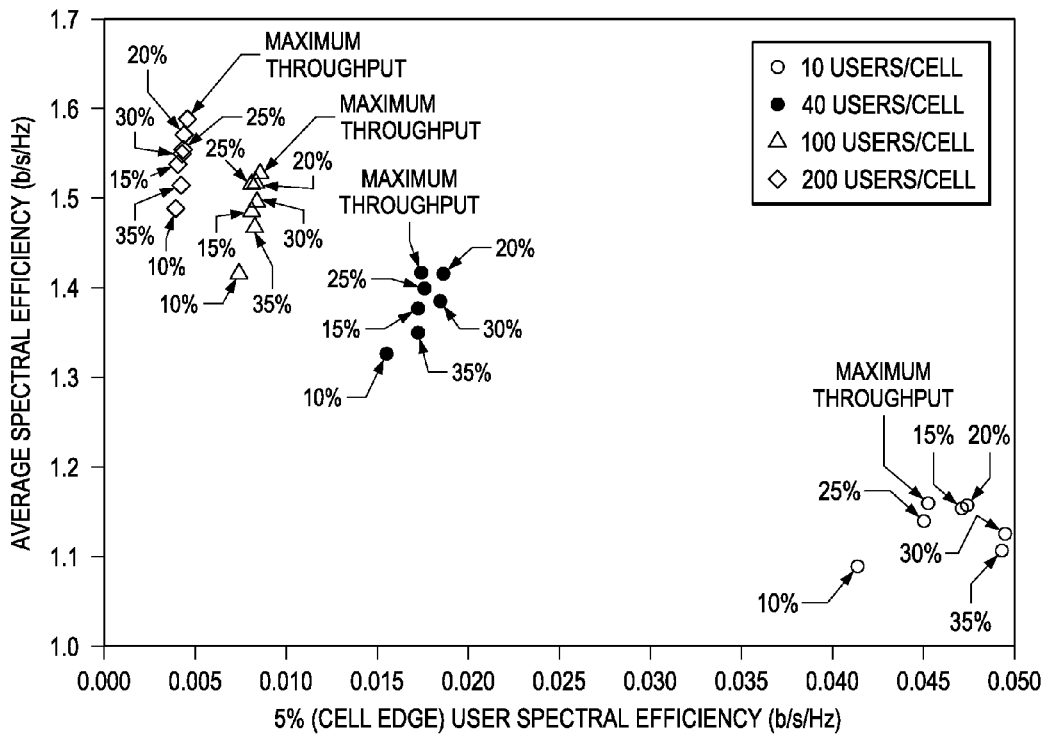

FIG. 8 compares the spectral efficiency performance of both Target BLER and Max Throughput schemes.

Figure 9:
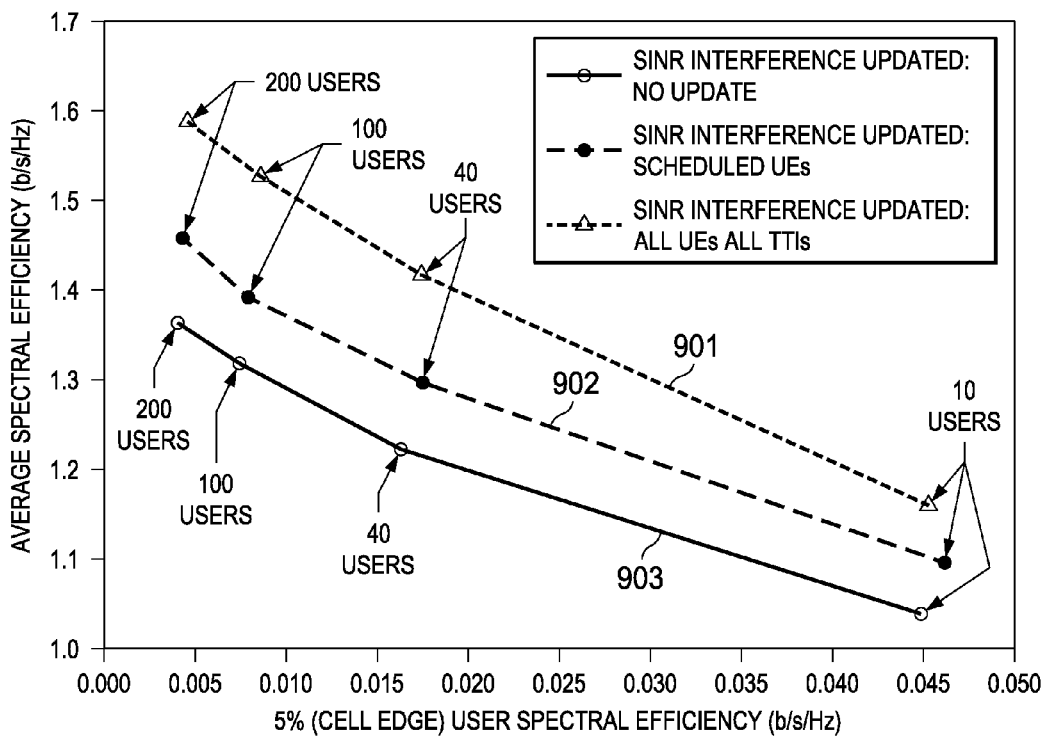

FIG. 9 illustrates average and cell-edge spectral efficiency performance for three options for updating UEs' SINR.

Figure 10:
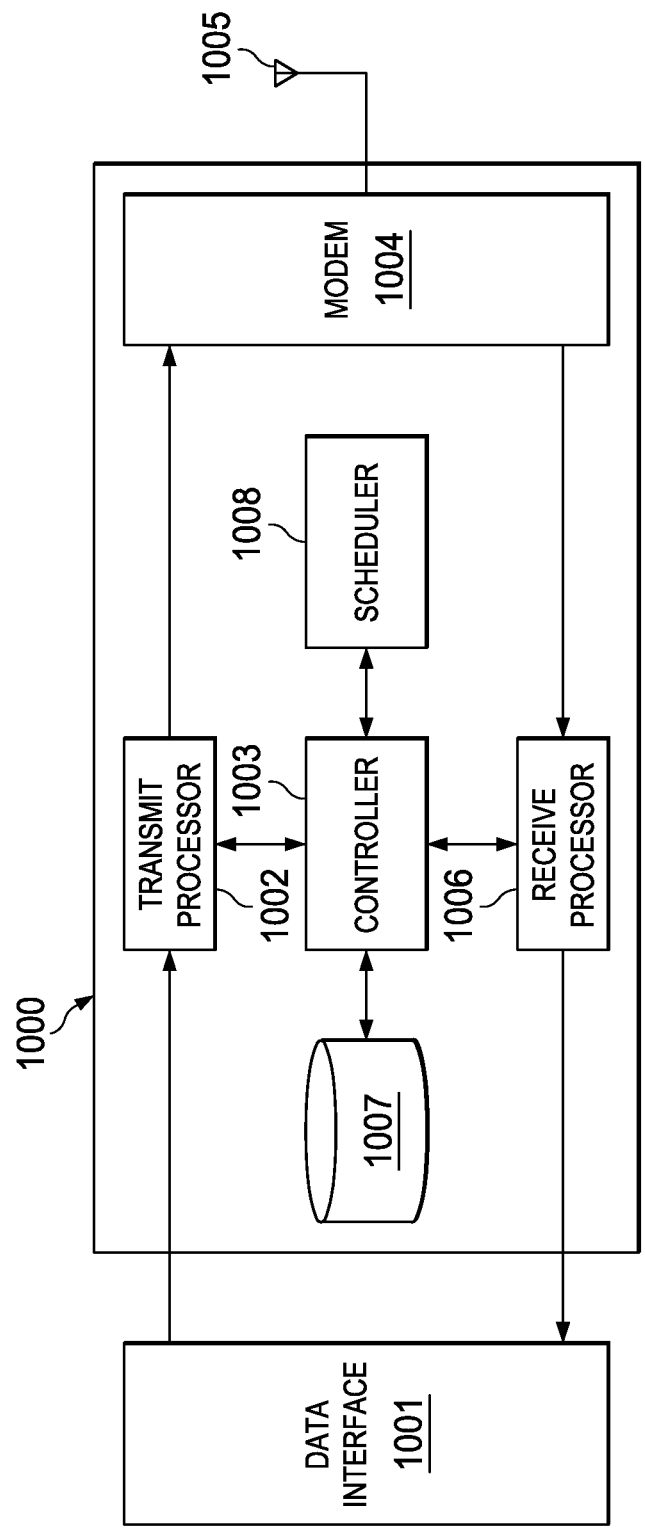

FIG. 10 is a high level block diagram of a system that may be used as an eNB or UE in one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

In one embodiment, two MCS mapping schemes of the ILLA are available using different optimization criteria: maximizing the throughput with and without a target BLER constraint.

Given an SINR $\Gamma_k$ for a user k available at transmission interval n and on frequency chunk b corresponding to an integer number $N_{PRB}$ of physical resource blocks (PRB), ILLA estimates an MCS for that user. This MCS is selected from a fixed MCS set to be assigned to this user and then used at a transmission interval n+K. In other words, an SINR measurement at interval n is used to select an MCS for a future interval n+K.

The MCS index i provides the transport block size (TBS) s($N_{PRB}$, i) which directly yields—or can be used instead of—the achievable data rate $r_{u,b}(t)$ of the user at transmission interval n+K, on frequency chunk b. Depending on the type of traffic being served, link adaptation is driven by two different requirements:

1) For time-sensitive traffic, such as VoIP, SIP signaling, signaling radio bearers (SRB), Random Access Channel (RACH) response and message 3, the LA strategy is to maximize throughput under the constraint of not exceeding a target BLER.

2) For non-time-sensitive traffic, such as non-guaranteed bit rate (GBR), ad-hoc users (e.g., FTP), the LA strategy is to maximize throughput without any BLER constraint.

The base station classifies accordingly the radio bearers of the user equipments it serves, also referred to as serving user equipments. Such classification may be made based on standardized QoS class identifiers (QCIs) specified for LTE.

Non-Time Sensitive Traffic without a BLER Constraint:

The scheme for ILLA that maximizes throughput without BLER constraint is referred to herein as "Max Throughput." Instantaneous throughput can be approximated as:

$$\tau(N_{PRB}, \Gamma, l) = r(N_{PRB}, l) \times (1 - BLER(N_{PRB}, \Gamma, l)) \quad \text{(Eq. 1)}$$

where $BLER(N_{PRB}, \Gamma, l)$ is the block error rate given UE's SINR $\Gamma$, allocation size $N_{PRB}$ and MCS index l. As a result, the MCS index $l_{best}$ is chosen according to the Max Throughput criterion as follows:

$$l_{best} = \mathrm{argmax}_l \{\tau(N_{PRB}, \Gamma, l)\} \quad \text{(Eq. 2)}$$

FIG. 1 illustrates MCS selection based on Max Throughput. The curves 101 in FIG. 1 illustrate how MCS selection reduces to a set of SINR thresholds that are derived from additive white Gaussian noise (AWGN) single input single output (SISO) link-level BLER performance curves 101 that are pre-computed in look-up tables (LUT) and that reflect the UL receiver performance of the eNodeB. Curves 101 show the throughput "envelope" 102 achieved from the twenty-nine MCS performance lookups available in LTE for the $N_{PRB}=4$ PRB size. There are as many LUTs available as allocation sizes.

Time Sensitive Traffic with a BLER Constraint:

The scheme for ILLA that maximizes throughput under a Target BLER constraint is referred to herein as "Target BLER." In this case, an additional BLER threshold $T_{BLER}$ is applied on top of the above selection rule so that Equation (1) above may be refined to:

$$\tau(N_{PRB}, \Gamma, l) = \begin{cases} r(N_{PRB}, l) \times \\ (1 - BLER(N_{PRB}, \Gamma, l)); & \text{if } BLER(N_{PRB}, \Gamma, l) \leq T_{BLER} \\ 0 & \text{else} \end{cases} \quad \text{(Eq. 3)}$$

wherein the selection rule in Equation 2 applies similarly.

FIG. 2 illustrates spectral efficiency resulting from MCS mapping. FIG. 2 plots the resulting instantaneous spectral efficiency defined as $\tau(N_{PRB}, \Gamma, l_{best})/(N_{PRB}\Delta f_{PRB})$, where $\Delta f_{PRB}$ is the PRB bandwidth (=180 kHz). As illustrated in the figure, the 1-PRB performance 201 shows a gap of approximately 2 dB compared to the 4-PRB (202) and 8-PRB (203) performance. This is due to the weaker performance of the forward error correction (FEC) with smaller blocks. As a result, the 1-PRB allocations should be mainly driven by UE's power limitations.

ILLA uses the SINR estimates available at time t to predict an instantaneous throughput at later time t+τ. As a result, there is a prediction error that may be addressed by applying a backoff to the SINR estimates at the ILLA input. The backoff value is adapted independently for each UE in the outer loop at a slow rate. Published OLLA algorithms use HARQ results to estimate the achieved BLER and adapt the backoff accordingly. This is an appropriate approach for radio bearers with latency constraints that use the Target BLER MCS mapping scheme discussed above. However, this approach is not justified for radio bearers without a target BLER constraint—i.e., those radio bearers whose only target is to achieve the highest throughput regardless of the resulting BLER. Therefore, similar to ILLA, two different OLLA algorithms may be implemented to address the cases both with and without a target BLER constraint.

The same general principle is used in both cases. For each UE, a metric is averaged across a measurement interval consisting of P measurements resulting from P transmissions. As a result, even though P is common to all UEs, different measurement intervals can be of different durations depending on how often the UE was scheduled for transmission. At the end of the measurement interval (i.e., after P transmissions), the backoff value may be increased or decreased by a backoff step (dB) depending on the metric value.

During a measurement interval, the ILLA applies the backoff value resulting from the previous measurement interval. Tuning both the measurement interval size and the backoff step allows for optimization of the trade-off of the performance/convergence time of the algorithm.

FIG. 3 illustrates an OLLA algorithm for the Target BLER MCS mapping criterion. The algorithm may be implemented for all radio bearers with a Target BLER constraint with the aim of achieving the requested target BLER. The algorithm consists, for each UE, in measuring the achieved BLER defined as the success rate of the P initial transmissions of the UE across the measurement interval. At the end of the measurement interval, the backoff value is increased or decreased by the backoff step depending on whether the measured BLER is higher or lower than the target BLER.

During a first measurement interval n 31, ILLA applies an SINR that has been adjusted by the value backoff(n). Also during the first interval n 31, OLLA evaluates the BLER measurements. In step 301, P first transmission results are collected. The results indicate success or failure of the P transmissions. In step 302, a BLER estimate is calculated using the results of the P first transmission results.

In step 303, the estimated BLER is compared to a Target BLER. If the BLER estimated in interval n 31 is greater than the Target BLER, then in step 304 the next backoff value backoff(n+1) is increased by adding a step value to the current backoff value. If the BLER estimated in interval n 31 is less than the Target BLER, then in step 305 the next backoff value backoff(n+1) is decreased by subtracting the step value from the current backoff value.

The new backoff value backoff(n+1) is then applied to the SINR in the next measurement interval (n+1) 32. In each measurement interval, the algorithm 301-305 is repeated to calculate the backoff for subsequent intervals.

FIG. 4 illustrates an OLLA algorithm for the Max Throughput MCS mapping criterion. For all radio bearers with the Max Throughput MCS mapping criterion, the algorithm depicted in FIG. 4 is aimed at maximizing the UE's throughput irrespective of the achieved BLER.

In the first measurement interval n 41, for each UE, the achieved throughput per PRB $T_{PRB}(n)$ is collected on P scheduled TTIs in step 401. $T_{PRB}(n)$ is calculated in step 402. $T_{PRB}(n)$ is defined as the sum of bits per PRB successfully received across the P transmissions, including re-transmissions, of the UE during the measurement interval n:

$$T_{PRB}(n) = \sum_{p=1}^{P} t_{PRB}(p) = \sum_{p=1}^{P} \frac{N_b(p)}{N_{PRB}(p)} \quad \text{(Eq. 4)}$$

where Nb(p) and $N_{PRB}(p)$ are the number of bits successfully decoded and the allocation size, in PRBs, at transmission p respectively.

In step 403, the throughput is further averaged across measurement intervals through infinite impulse response (IIR) filtering:

$$\overline{T}_{PRB}(n) = \alpha \overline{T}_{PRB}(n-1) + (1-\alpha) T_{PRB}(n) \quad \text{(Eq. 5)}$$

In step 404, the relative throughput variation across measurement interval n is then computed as:

$$\Delta \overline{T}_{PRB}(n) = [(\overline{T}_{PRB}(n) - \overline{T}_{PRB}(n-1))] / \overline{T}_{PRB}(n-1) \quad \text{(Eq. 6)}$$

In step 405, the relative throughput variation across measurement interval n is compared with a hysteresis threshold $T_{Hyst}$ for potential backoff update. If the relative throughput variation across measurement interval n is less than the hysteresis threshold, then in step 406 the backoff value for the next interval (n+1) 42 is the same as the current backoff value. However, if the relative throughput variation across measurement interval n is equal to or greater than the hysteresis threshold in step 405, then the backoff value is adjusted by a step value. The backoff for the next interval can be shown as:

$$backoff(n+1) = \begin{cases} backoff(n) & \text{if } |\Delta \overline{T}_{PRB}(n)| \leq T_{Hyst} \\ backoff(n) + \text{step}(n+1) & \text{else} \end{cases} \quad \text{(Eq. 7)}$$

The value for step (n+1) is dependent upon the relationship between the throughput variation across measurement interval n 41 and the throughput variation across prior measurement interval n−1. In step 407, if the throughput variation has increased in the current interval n, then the backoff for the next interval is increased by the step value in step 409. Otherwise, if the throughput variation has decreased in the current interval n, then the backoff for the next interval is decreased by the step value in steps 408 and 409. The step value for the next interval can be shown as:

$$\text{step}(n+1) = \begin{cases} \text{step}(n) & \text{if } |\Delta \overline{T}_{PRB}(n)| \leq T_{Hyst} \text{ or} \\ & \overline{T}_{PRB}(n) > \overline{T}_{PRB}(n-1) \\ -\text{step}(n) & \text{else} \end{cases} \quad \text{(Eq. 8)}$$

Both IIR filtering 403 and hysteresis threshold 405 aim at bringing stability to the algorithm and their parameters α and $T_{Hyst}$ may be optimized on top of the interval size and the backoff increment by sweeping across a wide range of values.

In LTE uplink (UL), UEs are time and frequency multiplexed on a physical uplink shared channel (PUSCH) and a physical uplink control channel (PUCCH). Time and frequency synchronization between UE's guarantees optimal intra-cell orthogonality.

The LTE UL SC-FDMA access scheme involves discrete Fourier transform (DFT) precoding over M tones, where M is the UE allocation size, corresponding to an integer number $N_{PRB}$ of PRBs of 12 tones each. The resulting effective SINR $\Gamma_k$ of UE k with the LMMSE receiver is:

$$\Gamma_k = \frac{\sum_{m=0}^{M-1} \frac{\gamma_k[m]}{\gamma_k[m]+1}}{M - \sum_{m=0}^{M-1} \frac{\gamma_k[m]}{\gamma_k[m]+1}} = \frac{1}{\frac{1}{M}\sum_{m=0}^{M}(\gamma_k[m]+1)^{-1}} - 1 \quad \text{(Eq. 9)}$$

where $\gamma_k[m]$ is the SINR over the m-th tone, expressed as:

$$\gamma_k[m] = \sum_{n=1}^{N_R} \frac{|h_{k,n}[m]|^2}{\sigma_n^2[m]} \quad \text{(Eq. 10)}$$

where $h_{k,n}$ and $\sigma_n^2$ are the vector components associated to antenna n of the channel $h_k[m]$, and AWGN plus out-of-cell interference variance R[m] respectively, and $N_R$ is the number of receive antennas.

Equation 9 performs so-called harmonic averaging across tones of the per-tone SINR. Practical MAC schedulers may use larger than per-PRB frequency granularity, corresponding to the minimum frequency band of a user's allocation and referred to as a "scheduling unit." There are typically two methods for SINR computation depending on what type of scheduling unit a scheduler supports: either a fixed scheduling unit size (also referred to as fixed transmission bandwidth (FTB)) or a variable scheduling unit size (adaptive transmission bandwidth (ATB)). With the former case, SINR is directly computed from per-subcarrier to per scheduling unit (1-step) using Equation 9. The latter case typically addresses recursive maximum expansion (RME) scheduling algorithms where different winners can have different allocation sizes, depending on the scheduling metric envelope shape. The envelope is computed with a small granularity, and for the simplest RME algorithm, the final averaging across allocated PRBs is only computed for the winners. We assume this type of scheduler herein.

Each active user competes for a scheduling unit resource with a scheduling metric. The proportional fair (PF) metric for each scheduling unit b and competing user k is computed in a frequency domain packet scheduler (FDPS) as:

$$\rho_{k,b}(t) = \frac{r_{k,b}(t)}{T_k(t)} \quad \text{(Eq. 11)}$$

where $r_{k,b}(t)$ and $T_k(t)$ are the achievable instantaneous data rate for user k on scheduling unit b in the t-th scheduling period and the average data rate of user k at the t-th scheduling period, respectively.

$T_k(t)$ is estimated/updated through IIR filtering on every sub-frame for each UE based on the instantaneous rate $r_k(t)$ achieved in the t-th scheduling period:

$$\hat{T}_k(t) = \alpha_{IIR}\hat{T}_k(t-1) + (1-\alpha_{IIR})r_k(t) \quad \text{(Eq. 12)}$$

where $0 \le \alpha_{IIR} < 1$ is the forgetting factor of the IIR filter and can be tuned to monitor the averaging interval, thus allowing the above metric to range between a fair-only to a Max C/I greedy scheduler. This parameter can be used, for example, to trade-off cell-edge spectral efficiency versus cell average spectral efficiency and is UE-specific configurable.

Non-scheduled UEs will be assigned $r_k(t)=0$, while for scheduled UEs $r_k(t)$ can be validated either at allocation time or only once associated HARQ ACK is received. In Equation 11, only $r_{k,b}(t)$ varies across scheduling units, and it is derived from the estimate SINR $\Gamma_k(b)$ through the LA function.

UL Interference Correlation.

LTE UL implements synchronous Hybrid ARQ (HARQ) with 8 processes. FIG. 5 illustrates the UL HARQ timing where $T_P$ is the UE-eNB propagation delay. $T_{eNB\text{-}PUSCH}$ and $T_{UE}$ are the maximum latencies for the eNB to decode the PUSCH and prepare the associated ACK/NACK and for the UE to decode an UL grant (and/or an ACK/NACK) and prepare the UL transmission accordingly.

FIG. 5 shows DL 501 and UP 502 for an eNB and UL 503 and DL 504 for a UE. There is a fixed delay of 4 ms between the sub-frame (505) that conveys the UL grant from the eNB to the UE and the sub-frame (506) where the UL transmission from the UE takes place.

As observed from FIG. 5, accounting for realistic processing time for constructing the physical downlink channels and signals, the UL scheduler should make its decisions no later than on sub-frames 2-3 (508, 509), with freshest UL measurements from sub-frames 1-2 (507, 508).

A specific feature of LTE UL is the possibility to use non-adaptive HARQ retransmissions, where the UE re-uses the same allocation and MCS to retransmit a MAC PDU upon receiving NACK on the PHICH. This reduces DL control overhead by not transmitting an associated UL grant in conjunction with the ACK/NACK signal. In addition it creates, for a cell, whose neighbors all use non-adaptive retransmission, a significant level of correlation on the received interference across 8 sub-frames, since a fraction of UL transmissions will actually be re-transmissions. This is illustrated by the plots in FIG. 6, which show the correlation coefficient in time of the received interference power per sub-carrier and per antenna. As can be observed, the correlation is as high as 60% at 8 sub-frames lag, representing up to 50% increase compared to 7 and 9 sub-frames lag. This property can be used in the ILLA design, as explained below.

SINR Refreshing Options

It is clear from the above that a user's scheduling metric associated with a frequency chunk hypothesis is derived from its SINR measurement at this frequency chunk, $\sigma_k(b)$, involving its channel state information (CSI) vector $h_k[m]$ and the noise plus out-of-cell interference variance vector R[m] over the M tones of the chunk. The per-antenna per-tone CSI estimation is performed at the physical layer on the Sounding Reference Signal (SRS). The SRS is a wideband reference signal transmitted on the last SC-FDMA symbol of LTE sub-frames configured for SRS transmission, and offers a total multiplexing capacity for a given SRS bandwidth of 16 UEs per SRS symbol.

As a consequence, not all active users in the scheduler pool can be multiplexed in every SRS symbol instance so that they must also share this resource in time, resulting in a transmission period per UE larger than 1 ms, typically 10 ms. The interference variance is estimated at physical layer on the demodulation reference signal (DMRS) rather than the SRS, as it is more representative of the noise and interference experienced by PUSCH data symbols, which is what scheduler cares about. The channel vector $\Gamma_k[m]$ of user k is only available on sub-frames where it has a scheduled SRS. This is not the case of the noise plus out-of-cell interference variance vector R[m], measured on every available DMRS, and which can be updated at the sub-frame rate. As a result, if we want $\Gamma_k(b)$ to always reflect the freshest measurements, it should be re-computed for each user on every sub-frame to account for the new interference measurement (and potentially new channel measurement). However, such high SINR refreshing rate might be impractical complexity-wise when the number of active users increases (e.g. few tens to few hundreds), as it requires re-computing Equations 9 and 10 for each active UE on every millisecond. This is why a low-complexity scheduler will rather use the SRS period as UE's SINR refreshing rate, without considering updating it with fresher interference measurements. In this approach, SINR computation with Equations 9 and 10 is fully handled by the physical layer providing periodic SINR updates to the MAC scheduler and LA.

In one embodiment, the low-complexity scheduler may be improved by allowing the scheduler to re-compute the SINRs of scheduled UEs only, which represents a minor complexity increase. Indeed, the number of dynamically scheduled UEs per sub-frame in UL is expected to be in the order of 10-15.

FIG. 7 illustrates the principle of the two-step SINR computation and link adaptation scheme. More specifically, a 2-stage SINR computation/ILLA comprises:

1) Pre-scheduling: SINR $\Gamma_k(b)$ is computed upon every new UE's SRS instance with per-chunk granularity (Equation 9). A typical chunk size is four PRBs, and a sub-carrier decimation factor of up to 3 (on top of the native 2 due to SRS comb structure) can be tolerated without significant estimation loss. The computation uses the channel vector $h_k[m]$ and the noise plus out-of-cell interference variance vector $R[m]$ measured in this sub-frame. ILLA is performed based on $\Gamma_k(b)$ to derive $r_{k,b}(t)$ (or equivalently TBS) which is then further re-used as is by the scheduler in subsequent sub-frames, up to the next SRS instance of that user.

2) Post-scheduling: on every sub-frame, for link adaptation purposes, the SINRs $\Gamma_k(B_k)$ of the scheduled users k are re-computed to take into account both the size of the final allocations $B_k$ and the interference measurement from the sub-frame preceding by 8 ms the actual transmission sub-frame, corresponding to the HARQ period in ms determined by the number of HARQ processes and thus exploiting the correlation peak of the interference shown in FIG. 6.

Simulation Results.

Table 1 lists the main system simulation parameters for one test embodiment. The SRS period may be modeled for each UE k, assuming each UE can send a wideband SRS spanning the PUSCH bandwidth. All sub-frames may be configured for SRS transmission and all active UEs send their SRS with the same period (in sub-frames), but possibly with a different sub-frame offset $\delta_k \in \{0, 1 \ldots N_{sf}^{SRS}-1\}$. At trial startup, the UEs' SRS offsets are distributed randomly and uniformly across the above set.

TABLE 1

| System Simulation Parameters | |
|---|---|
| Numerology | 10 MHz (40 PRBs for PUSCH) |
| Test case | 3GPP case 1 [3GPP TR 25.814] |
| Cell Layout | Wrap-around with 21 cells |
| Simulation time | 5 runs, 30 s each. 5 s warm-up. |
| Active users per cell | 10 - 40 - 100 - 200 |
| Rx antennas | 2 |
| Channel Model | SCM 3D Urban Macro |
| Channel estimation | Ideal + 1.5 dB penalty (for both decoder and scheduler/LA) |
| UE speed | 3 km/h |
| Equalizer | MMSE w/t MRC |
| Traffic Model | Full buffer |
| Scheduling delay | 8 TTIs |
| SRS period | 10 TTIs |
| SINR refreshing | 3 options: 1) on new SRS for all UEs 2) + interference refresh for scheduled UEs 3) + interference refresh for all UEs on all sub-frames. |
| Power Control | FPC with P0_PUSCH = -86 dBm and $\alpha_{PC}$ = 0.8 |
| Scheduler | Full FDPS (no TD preselection), PF with $\alpha$IIR = |

TABLE 1-continued

| System Simulation Parameters | |
|---|---|
| | 0.999, RME. |
| Scheduling unit size | 4 PRBs |
| HARQ retransmissions | Non adaptive |

Performance and Tuning of the ILLA/OLLA Algorithms.

The proposed ILLA and OLLA algorithms were assessed while addressing the Target BLER and Max Throughput adaptation metrics. In these simulations, the ideal case was assumed wherein the SINR of each UE is refreshed on every sub-frame with the interference experienced in this sub-frame and with 40 active UEs per cell.

Table 2 shows the results of the OLLA parameters optimization process. The OLLA ramp-up time is the observed time it takes for an SINR backoff set to 0 dB to reach steady state.

TABLE 2

| Adaptation metric | Measurement period | Backoff increment | IIR coefficient A | $T_{Hyst}$ | OLLA ramp-up time |
|---|---|---|---|---|---|
| Target BLER | 50 measurements | 0.5 dB | NA | NA | 4 s |
| Max Throughput | 50 measurements | 0.1 dB | 0.95 | 20% | 2 s |

Table 3 shows the performance of the OLLA for the Target BLER adaptation metric. The BLER performance achieved for various BLER targets are shown. The performance is measured as the average success rate of 1st transmissions across all UEs, with and without the OLLA. As can be observed the OLLA is crucial for meeting the Target BLERs, even at high target BLER.

TABLE 3

| Target BLER | 10% | 20% | 30% | 35% |
|---|---|---|---|---|
| Achieved BLER w/t OLLA disabled | 37.1% | 43.2% | 42.1% | 40.8% |
| Achieved BLER w/t OLLA enabled | 13.1% | 22.5% | 30.2% | 35.9% |

FIG. 8 compares the spectral efficiency performance of both Target BLER for various targets and Max Throughput schemes, where the cell-edge (5% throughput) and cell average performances are mapped onto the x- and y-axis respectively. The BLER targets are displayed close to their corresponding performance point. As expected, the highest cell average spectral efficiency is always achieved by the Max Throughput scheme across the users' configurations. The Target BLER scheme gets to an optimum performance at 20% target BLER. However, given this scheme does not optimize for throughput, this value is expected to vary when the cell configuration changes, while the Max Throughput scheme is designed to guarantee an optimal performance for any scenario. Moreover, Table 4 shows that the average BLER observed when running the Max Throughput scheme is in the range of 26-28%, although the spectral efficiency performance of the Target BLER around these targets is weaker than, for example, at 20% target. This shows again that both algorithms aim at optimizing one performance, BLER or Throughput, but fail to jointly optimize both.

TABLE 4

| Number of active users | 10 | 40 | 100 | 200 |
|---|---|---|---|---|
| Achieved BLER | 26.4% | 27% | 27.4% | 28.3% |

Performance of the SINR Refreshing Options

FIG. 9 illustrates the average and cell-edge spectral efficiency performance for the three options for updating the UEs' SINR. FIG. 9 plots the achieved performance of three implementation options where Max Throughput was used as MCS mapping scheme. It shows that the proposed method, with a slight complexity increase, allows filling close to half the performance gap between the low complexity scheduler and the optimal scheduler.

Lowest Complexity (901): Scheduler does not Update UEs' SINRs in Between Two SRS Measurements Proposed method slightly increasing the above complexity (902): scheduler updates scheduled UEs' SINRs with interference measurement preceding by 8 ms the actual transmission sub-frame corresponding to the HARQ period in ms determined by the number of HARQ processes.

Highest complexity but optimal performance (903): scheduler updates all UEs' SINRs with latest interference measurement on every TTI.

Both FIGS. 8 and 9 illustrate the spectral efficiency gain from user diversity when increasing the number of users.

FIG. 10 is a high level block diagram of a system 1000 that may be used as an eNB or UE, which may be, for example, an eNBs 501 or UEs 502 in FIG. 5. System 1000 receives data to be transmitted from an interface 1001 at transmit processor 1002. The data may include, for example, audio or video information or other data file information to be transmitted. The transmit processor 1002 may also receive control information from a controller 1003. Transmit processor 1002 processes (e.g., encode and symbol map) the data and control information to obtain data symbols and control symbols. The transmit processor 1002 may also perform spatial processing or precoding on the data symbols and/or the control symbols. The output of the transmit processor 1002 is provided to a modem 1004. Modem 1004 processes the output symbol stream to obtain an output sample stream that is further processed by converting to analog, amplifying, and upconverting before being transmitted via antenna 1005. In other embodiments, multiple modems 1004 may be used to support multiple-input multiple-output (MIMO) transmission on multiple antennas 1005.

Signals are also received at system 1000 on antenna 1005 from other devices. The received signals are provided to modem 1004 for demodulation. Modem 1004 processes the signals by filtering, amplifying, downconverting, and/or digitizing, for example, to obtain input samples. Modem 1004 or a receive processor 1006 may further process the input samples to obtain received symbols. Receive processor 1006 then processes the symbols by demodulating, deinterleaving, and/or decoding, for example. Receive processor 1005 then provides decoded data to interface 1001 for use by the eNB or UE. Receive processor further provides decoded control information to controller 1003.

Controller 1003 may direct the operation of system 1000 in the eNB or UE, such as by mapping PUSCH and PDSCH to PRBs (i.e., in an eNB) or monitoring localized and distributed EPDCCH in different search spaces (i.e., in a UE). A memory 1007 may store data and program codes for controller 1003, transmit processor 1002, and/or receive processor 1006.

Additional components, such as a scheduler 1008 may schedule downlink and/or uplink data transmissions by system 1000 (e.g., in an eNB).

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for performing link adaptation, comprising:
   performing at a base station in a wireless network,
   classifying transmissions from user equipment into a first group of time-critical traffic and a second group of non-time-critical traffic;
   determining a first Modulation and Coding Scheme (MCS) for the transmissions in the first group;
   determining a second MCS for the transmissions in the second group;
   measuring a success rate from P initial transmissions by a user equipment in the first group;
   estimating a block error rate based upon the success rate of a defined number of initial transmissions;
   increasing a current backoff parameter if the estimated block error rate is greater than a target block error rate to create a new backoff parameter; and
   decreasing the current backoff parameter if the estimated block error rate is less than the target block error rate to create the new backoff parameter.

2. The method of claim 1, wherein the success rate for the initial transmissions is determined during a current measurement interval, and wherein the new backoff parameter is applied in a next measurement interval.

3. The method of claim 1, wherein the current backoff parameter is applied in an inner loop link adaptation process, and wherein the new backoff parameter is created as part of an outer loop link adaptation process.

4. The method of claim 3, further comprising:
   modifying a signal to interference plus noise ratio (SINR) parameter for the user equipment (UE) using the current backoff parameter in the inner loop adaptation process.

5. A method for performing link adaptation, comprising:
   performing at a base station in a wireless network,
   classifying transmissions from user equipment into a first group of time-critical traffic and a second group of non-time-critical traffic;
   determining a first Modulation and Coding Scheme (MCS) for the transmissions in the first group; and
   determining a second MCS for the transmissions in the second group;
   signaling to a user equipment the selected MCS in the group associated with the traffic type to be received from the user equipment;
   receiving a signal transmitted by the user equipment based on the signaled MCS;
   collecting throughput measurements for a user equipment in the second group over a predefined number of scheduled transmission time intervals;
   averaging the throughput measurements to compute a relative throughput variation across a measurement interval;
   comparing the relative throughput variation to a hysteresis threshold;
   modifying a next backoff parameter value relative to a current backoff parameter value if the relative throughput variation is greater than the hysteresis threshold; and setting the next backoff parameter value equal to the current backoff parameter value if the relative throughput variation is not greater than the hysteresis threshold.
6. The method of claim 5, further comprising:
modifying the next backoff parameter by a next step value.
7. The method of claim 6, further comprising:
setting the next step parameter value equal to a current step parameter value if a current averaged throughput is greater than a previous averaged throughput.
8. The method of claim 6, further comprising:
setting the next step parameter value to a current step parameter value with sign swap if a current relative throughput variation is less than a previous relative throughput variation.
9. The method of claim 5, further comprising:
averaging the throughput measurements using infinite impulse response (IIR) filtering.
10. The method of claim 5, wherein the measurement interval corresponds to a axed number of transmissions by the user equipment.
11. The method of claim 5, further comprising:
applying the current backoff parameter to an inner loop link adaptation process during a current measurement interval; and
applying the next backoff parameter to the inner loop link adaptation process during a next measurement interval.
12. The method of claim 5, further comprising:
determining a relative throughput variation for each of a plurality of user equipment over the scheduled transmission time intervals; and
determining a next backoff parameter for each of the plurality of user equipment.
13. A base station, comprising:
a controller configured to:
classify transmissions from user equipment into a first group of time-critical traffic and a second group of non-time-critical traffic;
determine a first Modulation and Coding Scheme (MCS) for the transmissions in the first group;
measure a success rate from P initial transmissions by a user equipment in the first group;
estimate a block error rate based upon the success rate of a defined number of initial transmissions;
increase a current backoff parameter if the estimated block error rate is greater than a target block error rate to create a new backoff parameter;
decrease the current backoff parameter if the estimated block error rate is less than the target block error rate to create the new backoff parameter;
determine a second MCS for the transmissions in the second group; and
a modem configured to signal the selected MCS to the user equipment and receive the transmissions from the user equipment.
14. A base station, comprising:
a controller configured to:
classify transmissions from user equipment into a first group of time-critical traffic and a second group of non-time-critical traffic;
determine a first Modulation and Coding Scheme (MCS) for the transmissions in the first group;
determine a second MCS for the transmissions in the second group;
collect throughput measurements for a user equipment in the second group over a predefined number of scheduled transmission time intervals;
average the throughput measurements across a measurement interval;
compute a relative throughput variation across the measurement interval;
compare the relative throughput variation to a hysteresis threshold;
modify a next backoff parameter value relative to a current backoff parameter value if the relative throughput variation is greater than the hysteresis threshold;
set the next backoff parameter value equal to the current backoff parameter value if the relative throughput variation is not greater than the hysteresis threshold; and
a modem configured to signal the selected MCS to the user equipment and receive the transmissions from the user equipment.
15. A method for performing link adaptation, comprising:
classifying received transmissions into a first group of time-critical traffic and a second group of non-time-critical traffic;
measuring a success rate from P initial received transmissions in the first group;
estimating a block error rate based upon the success rate of a defined number of received initial transmissions;
using said block error rate estimation to determine a first Modulation and Coding Scheme (MCS) for the transmissions in the first group;
collecting data rate measurements, in number of successfully transmitted bits per second, different from said success rate measurement, for received transmissions in the second group over a predefined number of scheduled transmission time intervals;
averaging the data rate measurements across a measurement interval;
using said averaged data rate measurements to determine a second MCS for the transmissions in the second group;
transmitting the selected MCS in the group associated with the traffic type to be received in the received transmissions; and
anticipating receipt of a responsive transmission based on the signaled MCS.
16. A base station, comprising:
circuitry for classifying received transmissions into a first group of time-critical traffic and a second group of non-time-critical traffic;
circuitry for measuring a success rate from P initial received transmissions in the first group;
circuitry for estimating a block error rate based upon the success rate of a defined number of received initial transmissions;
circuitry for using said block error rate estimation to determine a first Modulation and Coding Scheme (MCS) for the transmissions in the first group;
circuitry for collecting data rate measurements, in number of successfully transmitted bits per second, different from said success rate measurement, for received transmissions in the second group over a predefined number of scheduled transmission time intervals;
circuitry for averaging the data rate measurements across a measurement interval;
circuitry for using said averaged data rate measurements to determine a second MCS for the transmissions in the second group;
circuitry for transmitting the selected MCS in the group associated with the traffic type to be received in the received transmissions; and circuitry for receiving a responsive transmission based on the signaled MCS.

17. A base station, comprising:
a controller configured to:
- classify received transmissions into a first group of time-critical traffic and a second group of non-time-critical traffic;
- measure a success rate from P initial received transmissions in the first group;
- estimate a block error rate based upon the success rate of a defined number of received initial transmissions;
- use said block error rate estimation to determine a first Modulation and Coding Scheme (MCS) for the transmissions in the first group;
- collect data rate measurements, in number of successfully transmitted bits per second, different from said success rate measurement, for received transmissions in the second group over a predefined number of scheduled transmission time intervals;
- average the data rate measurements across a measurement interval;
- use said averaged data rate measurements to determine a second MCS for the transmissions in the second group; and a modem enabled to transmit the selected MCS from the base station and to receive in the base station a transmission responsive to the selected MCS.

* * * * *